US011553648B2

(12) United States Patent
Krehbiel et al.

(10) Patent No.: US 11,553,648 B2
(45) Date of Patent: Jan. 17, 2023

(54) CORN STALK ROLL DRIVE SYSTEM

(71) Applicant: Deere & Company, Moline, IL (US)

(72) Inventors: Nathan E. Krehbiel, Bettendorf, IA (US); Nathaniel R. Bernklau, Moline, IL (US); Nathan R. Vandike, Geneseo, IL (US); Austin M. Laugen, Davenport, IA (US); Alexander B. Lassers, Davenport, IA (US)

(73) Assignee: Deere and Company, Moline, IL (US)

( * ) Notice: Subject to any disclaimer, the term of this patent is extended or adjusted under 35 U.S.C. 154(b) by 127 days.

(21) Appl. No.: 16/397,862

(22) Filed: Apr. 29, 2019

(65) Prior Publication Data

US 2020/0337243 A1    Oct. 29, 2020

(51) Int. Cl.
    *A01D 69/00* (2006.01)
    *A01D 45/02* (2006.01)

(52) U.S. Cl.
    CPC ............ *A01D 69/00* (2013.01); *A01D 45/023* (2013.01); *A01D 45/025* (2013.01)

(58) Field of Classification Search
    CPC .... A01D 69/00; A01D 45/023; A01D 45/025; A01D 45/021; A01D 45/02; A01D 63/00; A01D 63/02; A01D 63/04; A01D 69/06; A01D 43/082; A01D 43/083; A01D 43/081
    See application file for complete search history.

(56) References Cited

U.S. PATENT DOCUMENTS

| 3,492,797 | A | * | 2/1970 | Sears | A01D 45/021 56/14.1 |
| 3,803,820 | A | * | 4/1974 | Knapp | A01D 45/021 56/98 |
| 3,807,152 | A | * | 4/1974 | Storm | A01D 45/021 56/98 |
| 3,995,412 | A | * | 12/1976 | Gaeddert | A01D 45/021 56/98 |
| 4,227,366 | A | * | 10/1980 | Pucher | A01D 45/021 56/106 |
| 4,539,799 | A | * | 9/1985 | Kalverkamp | A01D 45/021 56/106 |
| 5,056,303 | A | * | 10/1991 | Lawrence | A01D 45/22 56/14.5 |

(Continued)

FOREIGN PATENT DOCUMENTS

FR              2334284 A1 *  7/1977  ........... A01D 45/023

*Primary Examiner* — Alicia Torres
*Assistant Examiner* — Madeline I Runco
(74) *Attorney, Agent, or Firm* — Michael Best & Friedrich LLP (57) ABSTRACT

A row unit assembly for use with a corn harvester includes a first drive having an output shaft, a stalk roll that extends along a first axis and rotates about the first axis via the output shaft of the first drive. A second drive rotates a first drive member about a second axis that is substantially perpendicular to the first axis. A first conveyor extends around the first drive member and moves about the first drive member in response to rotation of the first drive member. A third drive rotates a second drive member about a third axis that is substantially parallel to the second axis. A second conveyor extends around the second drive member and moves about the second drive member in response to rotation of the second drive member.

18 Claims, 6 Drawing Sheets

(56) References Cited

U.S. PATENT DOCUMENTS

| | | | | |
|---|---|---|---|---|
| 5,176,573 A * | 1/1993 | Dow | ................ | A01D 67/00 |
| | | | | 460/42 |
| 5,467,828 A * | 11/1995 | Ruozi | ................ | A01D 33/06 |
| | | | | 171/36 |
| 5,826,415 A * | 10/1998 | Becker | ................ | A01D 45/021 |
| | | | | 56/66 |
| 5,921,070 A * | 7/1999 | Chamberlain | ................ | A01D 45/021 |
| | | | | 56/10.2 G |
| 5,924,269 A * | 7/1999 | McMillen | ................ | A01D 45/021 |
| | | | | 56/111 |
| 5,927,054 A * | 7/1999 | Chamberlain | ................ | A01D 45/021 |
| | | | | 56/10.2 E |
| 6,370,853 B1 * | 4/2002 | Randall | ................ | A01D 45/021 |
| | | | | 56/14.2 |
| 6,516,599 B1 * | 2/2003 | Clarke | ................ | A01D 45/023 |
| | | | | 56/111 |
| 10,602,666 B2 * | 3/2020 | Ricketts | ................ | A01D 45/021 |
| 10,694,674 B2 * | 6/2020 | McGraw | ................ | A01D 57/22 |
| 2005/0120695 A1 * | 6/2005 | Calmer | ................ | A01D 45/021 |
| | | | | 56/51 |
| 2015/0305240 A1 * | 10/2015 | Gessel | ................ | A01D 43/08 |
| | | | | 56/52 |
| 2015/0319925 A1 * | 11/2015 | Ricketts | ................ | A01D 45/023 |
| | | | | 56/10.2 R |
| 2016/0073585 A1 * | 3/2016 | Cook | ................ | A01D 41/142 |
| | | | | 56/10.8 |
| 2019/0021230 A1 * | 1/2019 | Bertino | ................ | A01D 45/10 |

\* cited by examiner

FIG. 6

CORN STALK ROLL DRIVE SYSTEM

BACKGROUND

The present disclosure relates to corn stalk rolls for a corn harvester and drive systems thereof.

SUMMARY

In one embodiment, the disclosure provides a row unit assembly for a corn harvester. The row unit assembly includes a first drive including an output shaft, a stalk roll having an elongate cylinder that extends along a first axis and rotates about the first axis via the output shaft of the first drive. A second drive includes a first output drive shaft that is rotates about a second axis, and a first conveyor that extends around the first output drive shaft and moves about the first output drive shaft in response to rotation of the first output drive shaft. A third drive includes a second output drive shaft that rotates about a third axis, and a second conveyor that extends around the second output drive shaft and moves about the second output drive shaft in response to rotation of the second output drive shaft. A cover is positioned substantially vertically above the first drive, the stalk roll, the second drive, the first conveyor, the third drive and the second conveyor.

In another embodiment, the disclosure provides a row unit assembly for a corn harvester. The row unit assembly includes a first drive having an output shaft, a stalk roll having an elongate cylinder that extends along a first axis and rotates about the first axis via the output shaft of the first drive. A first drive member rotates about a second axis that is substantially perpendicular to the first axis. A second drive rotates the first drive member about the second axis, and a first conveyor extends around the first drive member and moves about the first drive member in response to rotation of the first drive member. A second drive member rotates about a third axis that is substantially parallel to the second axis. A third drive rotates the second drive member about the third axis, and a second conveyor extends around the second drive member and moves about the second drive member in response to rotation of the second drive member.

In another embodiment, the disclosure provides a corn harvester including a work vehicle that moves along a ground surface and a crop divider connected to the work vehicle that separates adjacent rows of corn stalks. A first drive is connected to the work vehicle and has an output drive shaft. A stalk roll is connected to the output drive shaft and is rotatable about a first axis in response to rotation of the output drive shaft. A first plate is positioned above the stalk roll, and a second plate is positioned above the stalk roll. The first and second plates separate corn ears from corn stalks. A hopper is connected to the work vehicle to store harvested corn ears. A first drive member rotates about a second axis that is substantially perpendicular to the first axis. A second drive rotates the first drive member about the second axis, and a first conveyor extends around the first drive member and moves about the first drive member in response to rotation of the first drive member. A second drive member rotates about a third axis that is substantially parallel to the second axis. A third drive rotates the second drive member about the third axis, and a second conveyor extends around the second drive member and moves about the second drive member in response to rotation of the second drive member.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
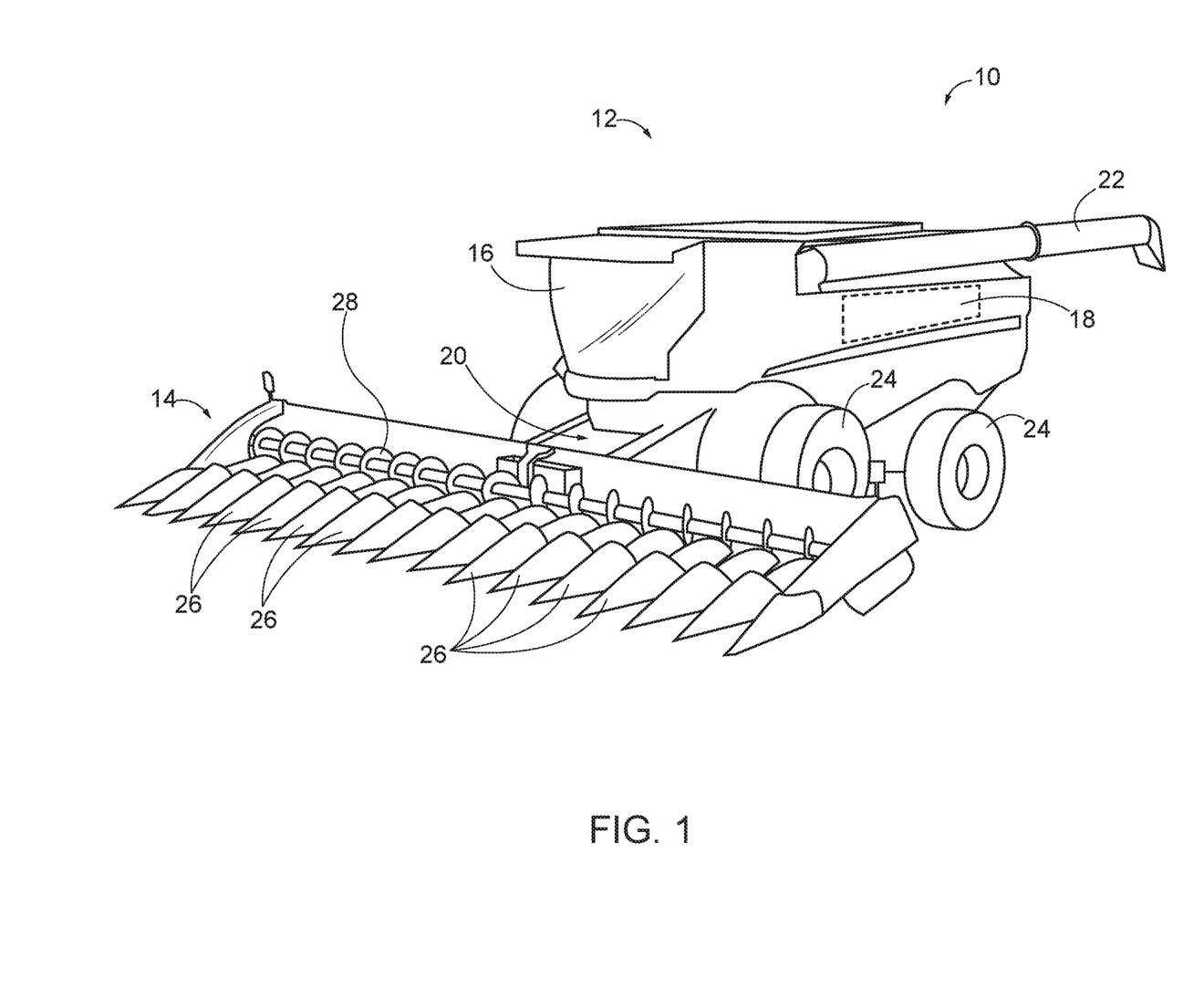
FIG. 1 is a perspective view of a corn harvester.

FIG. 1 illustrates a corn harvester 10 including a work vehicle 12 and a corn harvesting attachment 14. The illustrated work vehicle 12 includes an operator cab 16, an engine 18, a hopper 20, a dispensing chute 22, and a plurality of wheels 24. Other work vehicles can include tracks in place of the plurality of wheels. The illustrated corn harvesting attachment 14 includes a plurality of crop dividers 26 and a cross auger 28.

Figure 2:
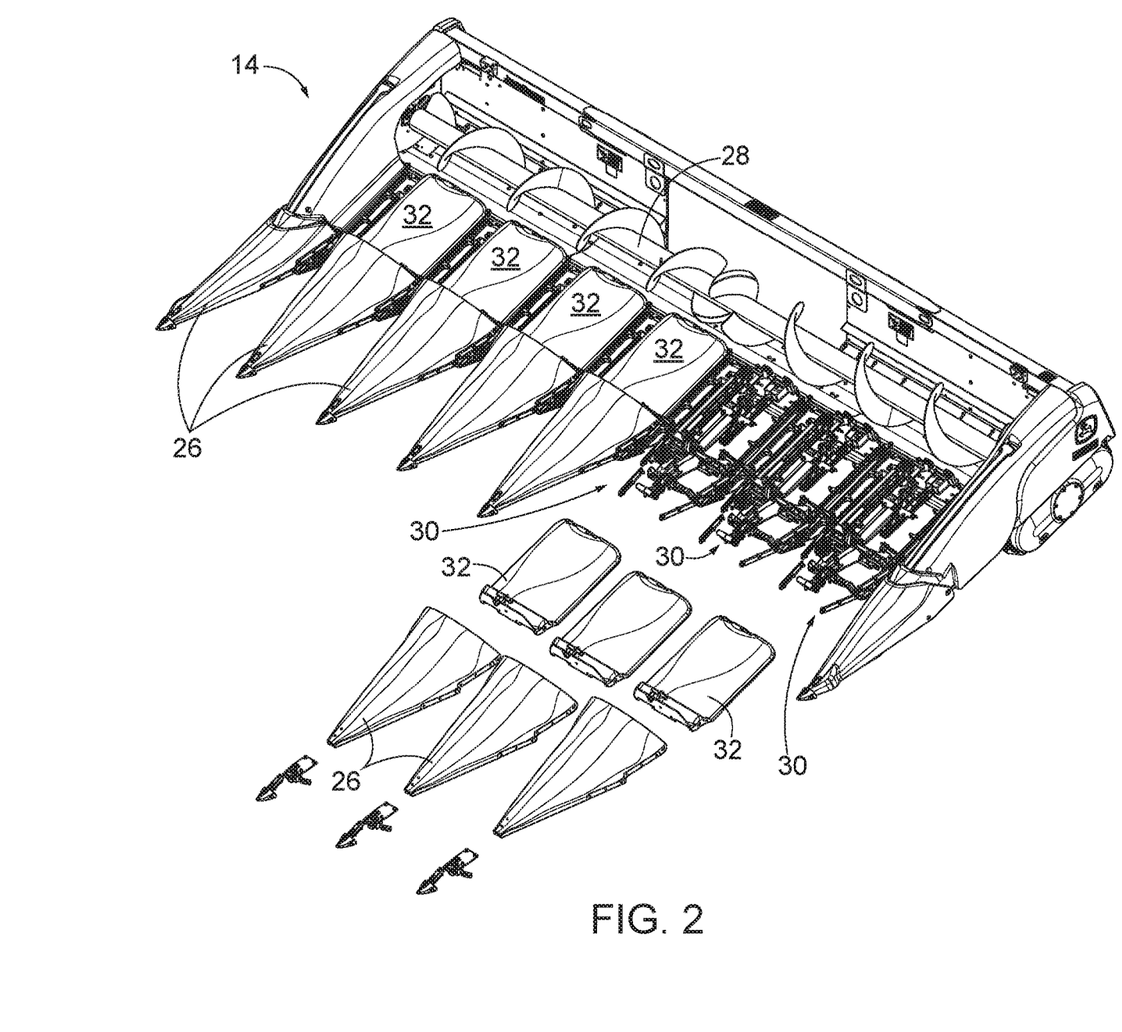
FIG. 2 is a perspective view of a corn harvesting attachment of FIG. 1.

FIG. 2 illustrates that each of the crop dividers 26 includes a row unit assembly 30 and a cover 32 positioned behind the crop divider 26 and between two stalk roll assemblies 30. The crop divider 26 directs corn stalks toward one of the stalk roll assemblies 30. Some stalk roll covers 32 are removed from some stalk roll assemblies 30 in FIGS. 2 and 3B.

Figure 3A:
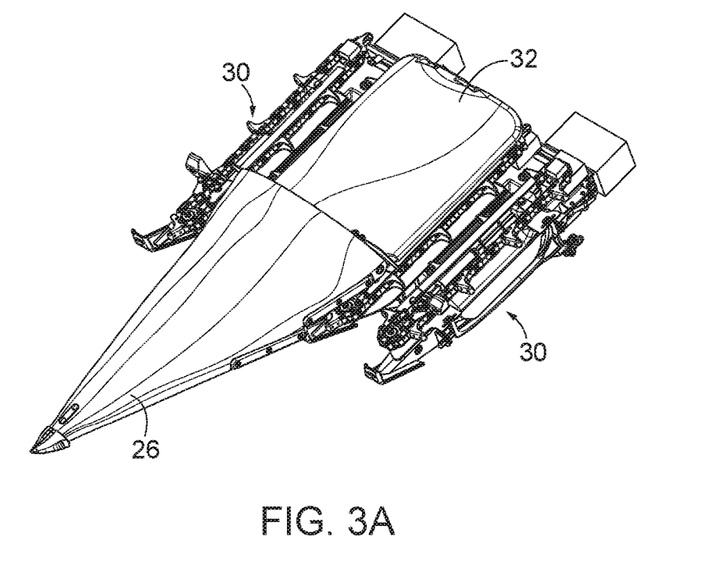
FIG. 3A is a perspective view of two corn stalk roll assemblies of the corn harvesting attachment of FIG. 2.
Figure 3B:
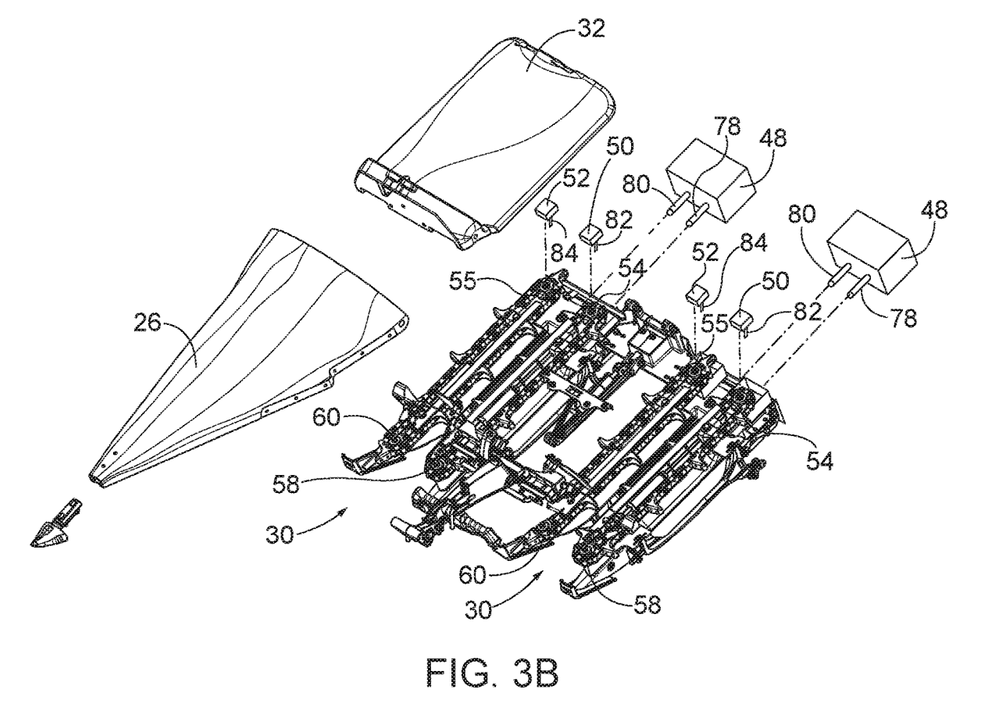
FIG. 3B is a partially exploded view of the corn stalk roll assemblies of FIG. 3A.

FIGS. 3A and 3B illustrate a pair of stalk roll assemblies 30 with the crop divider 26 and the cover 32 positioned between the pair of stalk roll assemblies 30. The cover 32 directs any harvested corn to the stalk roll assemblies 30 and inhibits any harvested corn from falling between the stalk roll assemblies 30 onto the ground.

Figure 4:
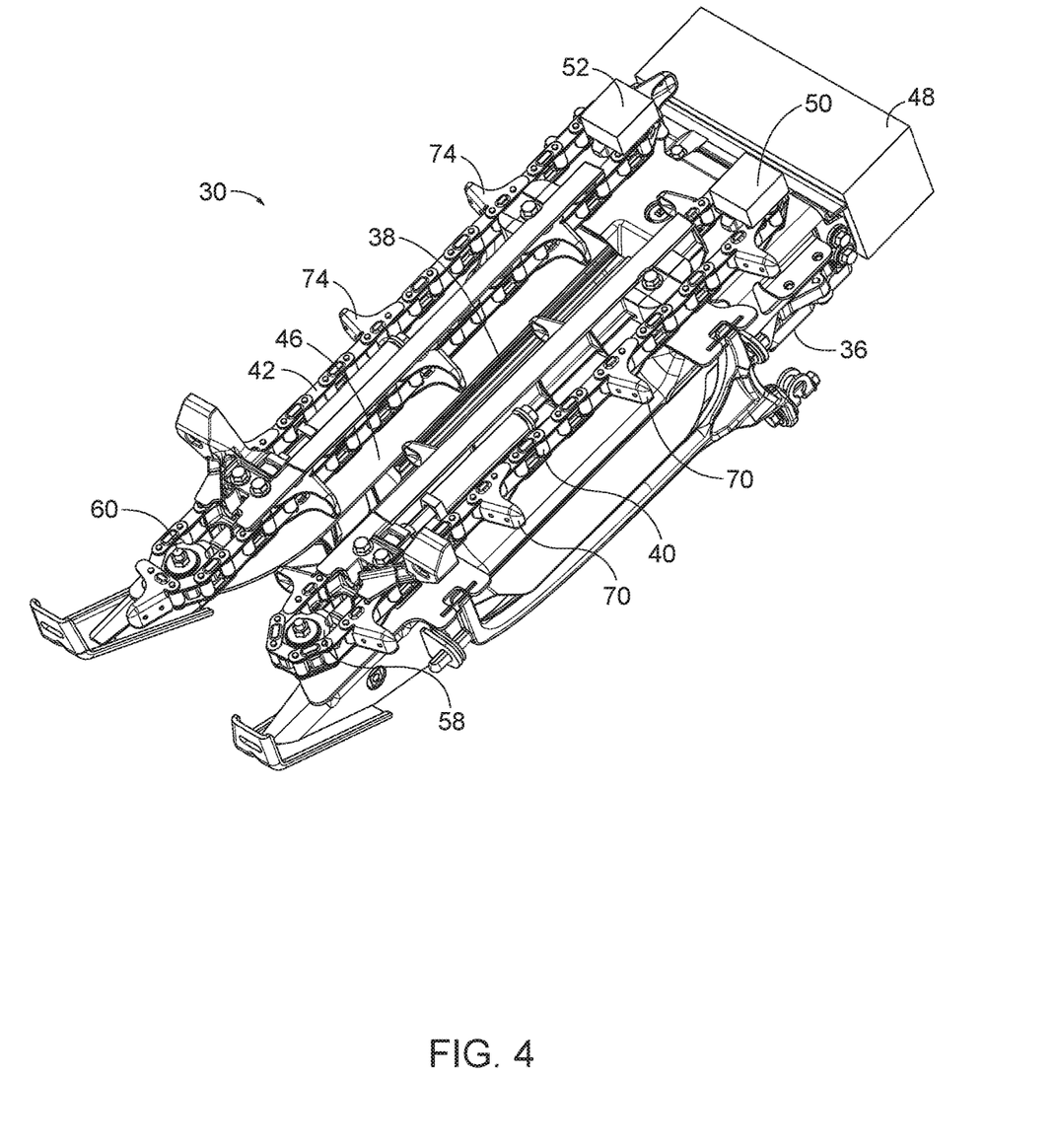
FIG. 4 is a top perspective view of one corn row unit assembly.
Figure 5:
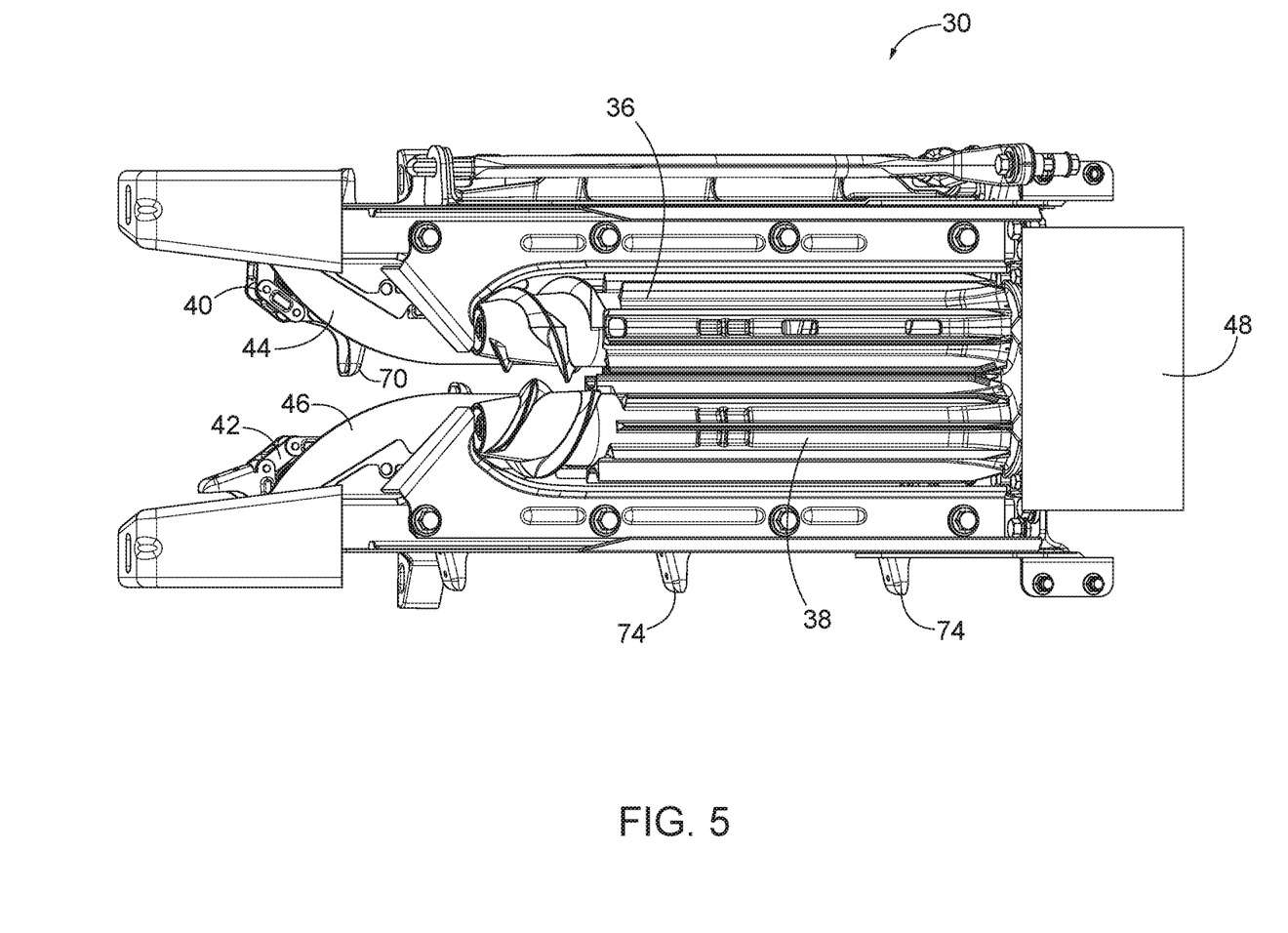
FIG. 5 is a bottom view of the corn row unit assembly.

FIGS. 4 and 5 more clearly illustrate one such row unit assembly 30. The illustrated row unit assembly 30 includes a first stalk roll 36, a second stalk roll 38, a first conveyor 40, a second conveyor 42, a first plate 44, a second plate 46, a first drive 48, a second drive 50, a third drive 52, a first drive member 54 (FIG. 3B), a second drive member 55 (FIG. 3B), a first idler member 58 and a second idler member 60.

With reference to FIGS. 4 and 5, the illustrated first stalk roll 36 includes a frustoconical tip having a helical blade, and a cylindrical portion having a plurality of first blades that extend along a circumference of the cylindrical portion of the first stalk roll 36 in the axial direction. The first stalk roll 36 is configured to rotate about a first longitudinal axis in response to the first drive 48.

The illustrated second stalk roll 38 includes a frustoconical tip having a helical blade and a cylindrical portion having a plurality of second blades that extend along a circumference of the cylindrical portion of the second stalk roll 38 in the axial direction. The second stalk roll 38 is configured to rotate about a longitudinal axis in response to the first drive 48.

The illustrated first conveyor 40 is a chain conveyor that includes a plurality of lugs 70 and is moveable in response to rotation of the first drive member 54. The illustrated first drive member 54 is a sprocket, but other suitable drive members can be utilized to move the first conveyor 40. The second drive 50 is connected to the first drive member 54 to cause rotation of the first drive member 54 and thus, movement of the lugs 70. The first drive member 54 rotates about a third axis. In the illustrated embodiment, the third axis is substantially perpendicular to the first axis and to the second axis.

The illustrated second conveyor 42 is a chain conveyor that includes a plurality of lugs 74 and is moveable in response to rotation of a second drive member 55. The illustrated second drive member 55 is a sprocket, but other suitable drive members can be utilized to move the second conveyor 42. The third drive 52 is connected to the second drive member 55 to cause rotation of the second drive member 55 and thus, movement of the lugs 74. The second drive member 55 rotates about a fourth axis. In the illustrated embodiment the fourth axis is substantially parallel to the third axis.

The first plate 44 is positioned above the first stalk roll 36 and below the first conveyor 40. The second plate 46 is positioned above the second stalk roll 38 and below the second conveyor 42. The first plate 44 is spaced from the second plate 46 a distance that is greater than an average diameter of corn stalks but is less that an average diameter of harvested corn ears.

As shown most clearly in FIG. 3B, the first drive 48 includes a first output shaft 78 and a second output shaft 80 extending substantially parallel to the axes of rotation of the first and second stalk rolls 36 and 38. The first output shaft 78 is connected to the first stalk roll 36 such that rotation of the first output shaft 78 causes rotation of the first stalk roll 36. The second output shaft 80 is connected to the second stalk roll 38 such that rotation of the second output shaft 80 causes rotation of the second stalk roll 38. The first drive 48 is positioned vertically below the cover 32. In some embodiments, the first drive 48 includes the first output shaft 78 and a separate, independently-driven, additional drive includes the second output shaft 80.

The illustrated second drive 50 includes a first output drive shaft 82 extending substantially perpendicular to the first and second output shafts 78, 80. The first output drive shaft 82 engages the first drive member 54 to rotate the first drive member 54 in response to rotation of the first output drive shaft 82. In the illustrated embodiment, the first output drive shaft 82 extends along the third axis. In some embodiments, the first output drive shaft 82 extends at a non-parallel angle with respect to the third axis, and includes at least one drive connection to rotate the first drive member 54 about the third axis. The first conveyor 40 is connected to the first drive member 54 and moves about the first drive member 54 in response to rotation of the first drive member 54. The first idler member 58 rotates in response to movement of the first conveyor 40 about the first drive member 54.

The second drive 50 is driven independently of the first drive 48. The second drive 50 is significantly smaller than the first drive 48 because the torque required to rotate the first drive member 54 is less than the torque required to rotate the first stalk roll 36 and the second stalk roll 38. The second drive 50 is connected to an underside of the cover 32.

The third drive 52 includes a second output drive shaft 84 extending substantially parallel to the first output drive shaft 82. The second output drive shaft 84 engages the second drive member 55 to rotate the second drive member 55 in response to rotation of the second output drive shaft 84. In the illustrated embodiment, the second output drive shaft 84 extends along the fourth axis. In some embodiments, the second output drive shaft 84 extends at a non-parallel angle with respect to the fourth axis, and includes at least one drive connection to rotate the second drive member 55 about the fourth axis. The second conveyor 42 is connected to the second drive member 55 and moves about the second drive member 55 in response to rotation of the second drive member 55. The second idler member 60 rotates in response to movement of the second conveyor 42 about the second drive member 55.

The third drive 52 is driven independently of the first drive 48 and independently of the second drive 50. The third drive 52 is significantly smaller than the first drive 48 because the torque required to rotate the second drive member 55 is less than the torque required to rotate the first stalk roll 36 and the second stalk roll 38. The third drive 52 is connected to an underside of the cover 32 at a location spaced apart from the second drive 50.

In some embodiments, the first drive 48 provides at least 50% of the overall power of the stalk roll assemblies 30, and the second and third drives 50 and 52 combined provide less than 50% of the overall power of the stalk roll assemblies 30. In some embodiments, the first drive 48 provides at least 60% of the overall power of the stalk roll assemblies 30, and the second and third drives 50 and 52 combined provide less than 40% of the overall power of the stalk roll assemblies 30. In some embodiments, the first drive 48 provides at least 70% of the overall power of the stalk roll assemblies 30, and the second and third drives 50 and 52 combined provide less than 30% of the overall power of the stalk roll assemblies 30. The first, second and third drives 48, 50, 52 can be mechanical, electrical or hydraulic. In some embodiments, all of the first, second and third drives 48, 50, 52 are mechanical, electrical or hydraulic. In other embodiments, the first drive 48 is one of mechanical, electrical or hydraulic, whereas the second and third drives 50 and 52 are another one of mechanical, electrical or hydraulic.

The separate first, second and third drives 48, 50, 52 allow flexibility in the size and configuration of the stalk roll assemblies 30. For example, the sizing, orientation and arrangement of the drives 48, 50 and 52, as well as the sizing, orientation and arrangement of the conveyors 40, 42, drive members 54, 55 and idler members 58, 60, can be changed to alter the overall size and shape of the stalk roll assemblies 30. In some embodiments, the overall width of the stalk roll assemblies 30 can be reduced. For example, the overall width of the stalk roll assemblies 30 can be between twenty and thirty inches, or potentially even narrower when separate first, second and third drives 48, 50, 52 are utilized.

Figure 6:
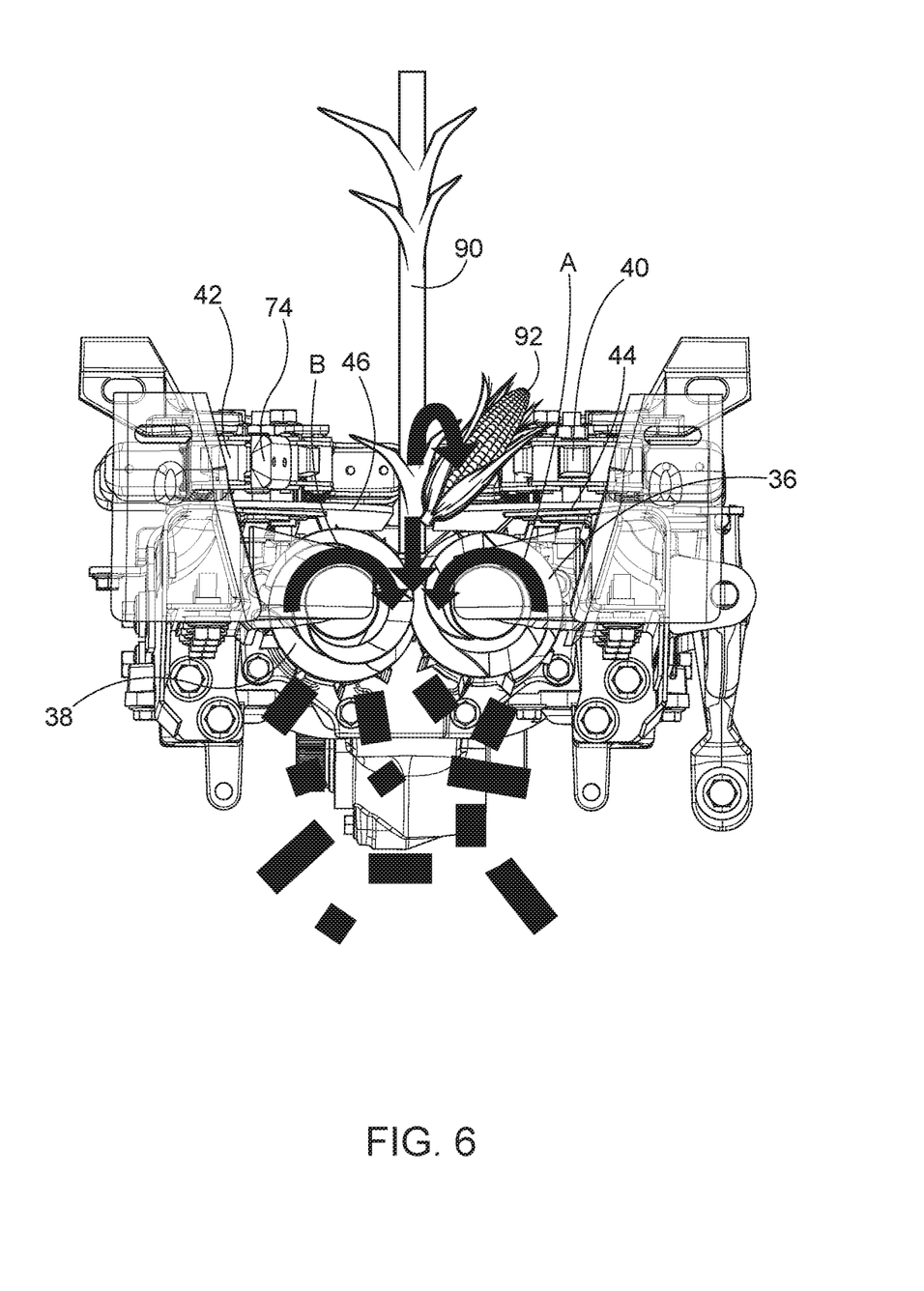
FIG. 6 is a schematic end view of the corn row unit assembly.

As shown in FIG. 6, the illustrated first stalk roll 36 is rotated in the direction of arrow A, which is counter clockwise when viewed from the end with the frustoconical tip. As shown in FIG. 6, the illustrated second stalk roll 38 is rotated in the direction of arrow B, which is clockwise when viewed from the end with the frustoconical tip. Rotation of the first stalk roll 36 in the direction of arrow A and rotation of the second stalk roll 38 in the direction of arrow B draws a corn stalk 90 down and the plurality of first and second blades 56 and 66 cut the corn stalk 90 into pieces and dispense the pieces downward. Harvested corn ears 92 are retained on the first and second plates 44 and 46 and are thus stripped off of the corn stalk 90. The spacing between the first and second plates 44 and 46 permits the corn stalks to slide between the plates 44 and 46 but the first and second plates 44 and 46 retain harvested corn ears 92 on top of the plates 44 and 46.

With reference to FIGS. 4 and 5, the lugs 70 and 74 on the respective conveyors 40 and 42 move the harvested corn ears 92 along the first and second plates 44 and 46 and toward the cross auger 28. As shown in FIG. 2, the covers 32 retain the harvested corn ears 92 above the ground surface. As shown in FIG. 1, the cross auger 28 rotates to move harvested corn ears 92 toward the hopper 20. The corn kernels are then stripped off of the harvested corn ears 92 and are directed out the dispensing chute 22. A second work vehicle, such as a wagon, is positioned to receive the corn kernels from the dispensing chute 22.

Various features and advantages of the disclosure are set forth in the following claims.

What is claimed is:

1. A row unit assembly for a corn harvester configured to move in a harvesting direction along a surface, the row unit assembly comprising:
    a first drive including an output shaft;
    a stalk roll having an elongate cylinder extending along a first axis and being rotatable about the first axis via the output shaft of the first drive, the stalk roll extending parallel to the harvesting direction;
    a second drive including a first output drive shaft that is rotatable about a second axis, the second drive is positioned forwardly of the first drive in the harvesting direction, and the first output drive shaft of the second drive is positioned above the output shaft of the first drive;
    a first conveyor extending around the first output drive shaft and moveable about the first output drive shaft in response to rotation of the first output drive shaft;
    a third drive including a second output drive shaft that is rotatable about a third axis, the third drive being spaced from the second drive and the third axis being spaced from the second axis in a direction orthogonal to an axial direction of the third axis, the third drive is positioned forwardly of the first drive in the harvesting direction;
    a second conveyor extending around the second output drive shaft and moveable about the second output drive shaft in response to rotation of the second output drive shaft; and
    a cover positioned substantially vertically above, the stalk roll, the second drive, the first conveyor, a third drive of an adjacent row unit, and a second conveyor of the adjacent row unit,
    wherein the first drive is configured to be driven independently of the second drive, and the second drive is configured to be driven independently of the third drive.

2. The row unit assembly of claim 1, wherein the second drive is mounted to the cover, and the third drive of the adjacent row unit is mounted to the cover.

3. The row unit assembly of claim 1, wherein the second drive is mounted to an underside of the cover at a first location and the third drive of the adjacent row unit is mounted to the underside of the cover of the row unit assembly at a second location, the second location being spaced apart from the first location.

4. The row unit assembly of claim 1, wherein the output shaft is a first output shaft and the stalk roll is a first stalk roll, the first drive further comprising a second output shaft, the row unit assembly further comprising a second stalk roll having a second elongate cylinder extending along a fourth axis and being rotatable about the fourth axis via the second output shaft of the first drive, wherein the second output shaft is positioned above the second output drive shaft of the third drive, and wherein the stalk roll extends parallel to the harvesting direction.

5. The row unit assembly of claim 4, wherein the first axis is substantially perpendicular to the second axis, is substantially perpendicular to the third axis, and is substantially parallel to the fourth axis.

6. The row unit assembly of claim 4, further comprising a first plate positioned above the first stalk roll, and a second plate positioned above the second stalk roll, the first and second stalk rolls being spaced apart to permit corn stalks to move between the first and second plates and to separate corn ears from corn stalks, and wherein the first axis is substantially perpendicular to the second axis, and wherein the second axis is substantially parallel to the third axis.

7. The row unit assembly of claim 1, further comprising a first idler member spaced apart from the first output drive shaft, the first conveyor configured to engage the first idler member and to move about the first output drive shaft and the first idler member, and
    a second idler member spaced apart from the second output drive shaft, the second conveyor configured to engage the second idler member and to move about the second output drive shaft and the second idler member.

8. A row unit assembly for a corn harvester configured to move in a harvesting direction along a surface, the row unit assembly comprising:
    a first drive including an output shaft;
    a stalk roll having an elongate cylinder extending along a first axis and being rotatable about the first axis via the output shaft of the first drive, the stalk roll extending parallel to the harvesting direction;
    a first drive member rotatable about a second axis, the second axis being substantially perpendicular to the first axis, the first drive member is positioned above the output shaft of the first drive;
    a second drive configured to rotate the first drive member about the second axis, the second drive is positioned forwardly of the first drive in the harvesting direction;
    a first conveyor extending around the first drive member and moveable about the first drive member in response to rotation of the first drive member;
    a second drive member rotatable about a third axis, the third axis being substantially parallel to the second axis;
    a third drive configured to rotate the second drive member about the third axis, the third drive being separate from the second drive the third drive is positioned forwardly of the first drive in the harvesting direction; and
    a second conveyor extending around the second drive member and moveable about the second drive member in response to rotation of the second drive member,
    wherein the first drive is configured to be driven separately of the second drive, and the second drive is configured to be driven separately from the third drive.

9. The row unit assembly of claim 8, further comprising a cover positioned substantially vertically above, the stalk roll, the second drive, the second drive member, a third drive of an adjacent row unit, and a second conveyor of the adjacent row unit, and wherein the second drive is directly mounted to the cover.

10. The row unit assembly of claim 9, wherein the second drive is directly mounted to an underside of the cover at a first location and the third drive of the adjacent row unit is directly mounted to the underside of the cover of the row unit assembly at a second location, the second location being spaced apart from the first location.

11. The row unit assembly of claim 8, wherein the output shaft is a first output shaft and the stalk roll is a first stalk roll, the first drive further comprising a second output shaft, and the row unit assembly further comprising a second stalk roll having a second elongate cylinder extending along a fourth axis and being rotatable about the fourth axis via the second output shaft of the first drive, the fourth axis being substantially parallel to the first axis, and wherein the second drive member is positioned above the second output shaft, and wherein the stalk roll extends parallel to the harvesting direction.

12. The row unit assembly of claim 11, further comprising a first plate positioned above the first stalk roll, and a second plate positioned above the second stalk roll, the first and second stalk rolls being spaced apart to permit corn stalks to move between the first and second plates and to separate corn ears from corn stalks, and wherein the first conveyor and the second conveyor are configured to move corn ears along a top surface of the first and second plates in response to rotation of the first and second conveyors about the respective first and second drive members.

13. The row unit assembly of claim 8, further comprising a first idler member spaced apart from the first drive member, the first conveyor configured to engage the first idler member and to move about the first drive member and the first idler member, and
a second idler member spaced apart from the second drive member, the second conveyor configured to engage the second idler member and to move about the second drive member and the second idler member.

14. The row unit assembly of claim 9, wherein the stalk roll is a first stalk roll and the output shaft is a first output shaft, the first drive further includes a second output shaft, and the row unit assembly further includes a second stalk roll having an elongate cylinder extending along a fourth axis and being rotatable about the fourth axis via the second output shaft of the first drive, wherein the stalk roll extends parallel to the harvesting direction.

15. A corn harvester configured to move in a harvesting direction along a surface, the corn harvester comprising:
a work vehicle configured to move along a ground surface;
a crop divider connected to the work vehicle and configured to separate adjacent rows of corn stalks;
a first drive connected to the work vehicle and having an output drive shaft;
a stalk roll being connected to the output drive shaft and being rotatable about a first axis in response to rotation of the output drive shaft, the stalk roll extending parallel to the harvesting direction;
a first plate positioned above the stalk roll;
a second plate positioned above the stalk roll, the first and second plates being configured to separate corn ears from corn stalks;
a hopper connected to the work vehicle and configured to store harvested corn ears;
a first drive member rotatable about a second axis, the second axis being substantially perpendicular to the first axis, the first drive member is positioned forwardly of the first drive in the harvesting direction;
a second drive configured to rotate the first drive member about the second axis, the second drive is positioned above the output drive shaft of the first drive;
a first conveyor extending around the first drive member and moveable about the first drive member in response to rotation of the first drive member;
a second drive member rotatable about a third axis, the third axis being substantially parallel to the second axis, the second drive member is positioned forwardly of the first drive in the harvesting direction;
a third drive configured to rotate the second drive member about the third axis; and
a second conveyor extending around the second drive member and moveable about the second drive member in response to rotation of the second drive member,
wherein the second drive is configured to be driven independently of the third drive.

16. The corn harvester of claim 15, wherein the first drive is driven independently of the second drive.

17. The corn harvester of claim 15, a first cover positioned substantially vertically above the first drive, the stalk roll, the first drive member, the second drive, the first conveyor, the second drive member, and
a second cover positioned substantially vertically above the third drive and the second conveyor,
wherein the second drive is directly mounted to an underside of the first cover at a first location and the third drive is directly_mounted to an underside of the second cover at a second location, the second location being spaced apart from the first location.

18. The corn harvester of claim 15, wherein the output drive shaft is a first output drive shaft and the stalk roll is a first stalk roll, the corn harvester further comprising a second output drive shaft a second stalk roll connected to the second output drive shaft and being rotatable about a fourth axis in response to rotation of the second output drive shaft, the fourth axis being substantially parallel to the first axis.

* * * * *

UNITED STATES PATENT AND TRADEMARK OFFICE
CERTIFICATE OF CORRECTION

| | |
|---|---|
| PATENT NO. | : 11,553,648 B2 |
| APPLICATION NO. | : 16/397862 |
| DATED | : January 17, 2023 |
| INVENTOR(S) | : Nathan E. Krehbiel et al. |

It is certified that error appears in the above-identified patent and that said Letters Patent is hereby corrected as shown below:

In the Claims

Claim 1, Line 48: please replace "vertically above, the stalk" with --vertically above the stalk--

Claim 9, Line 61: please replace "vertically above, the stalk" with --vertically above the stalk--

Claim 17, Line 42: please replace "directly_mounted" with --directly mounted--

Signed and Sealed this
Ninth Day of April, 2024

Katherine Kelly Vidal
*Director of the United States Patent and Trademark Office*